Feb. 17, 1948. M. L. REANEY 2,436,180
PHOTOGRAPHIC EXPOSURE FRAME
Filed March 19, 1946
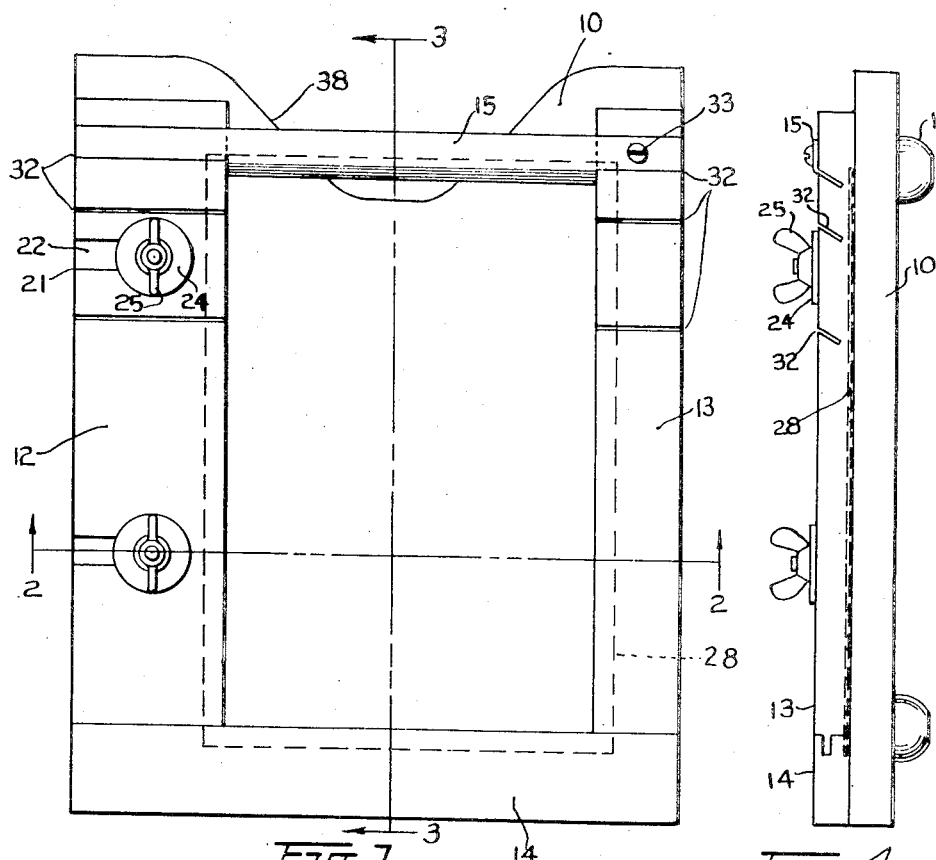
Fig. 1.
Fig. 4.
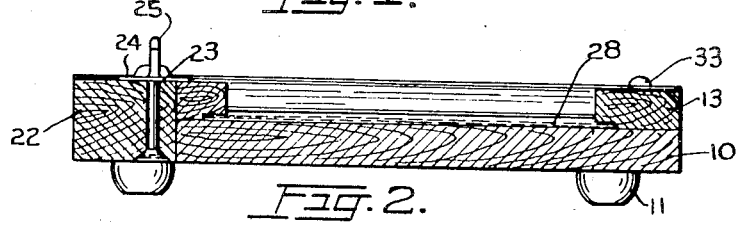
Fig. 2.
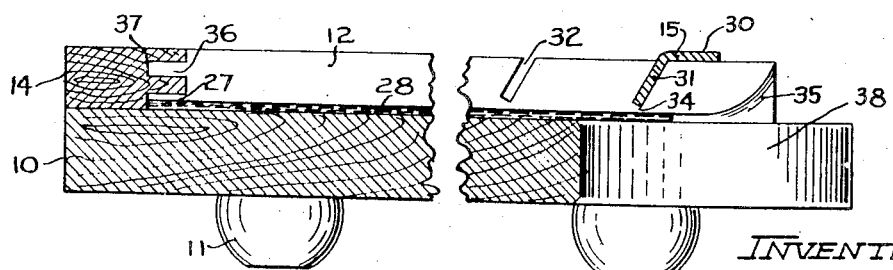
Fig. 3.
INVENTOR
Maurice L. Reaney
BY
ATTORNEY Patented Feb. 17, 1948

2,436,180

UNITED STATES PATENT OFFICE 2,436,180

PHOTOGRAPHIC EXPOSURE FRAME

Maurice L. Reaney, Vancouver, Wash.

Application March 19, 1946, Serial No. 655,424

5 Claims. (Cl. 38—24)

The present invention relates to a photographic exposure frame and particularly to a masking frame for use with photographic enlarging papers.

In the exposure of photographic enlarging paper, it is frequently desired to mask the edges of the paper in such manner that borders of uniform width can be obtained without the necessity of trimming the paper after exposure and development. Usually loose strips of masking material have been placed over the edges of the paper for this purpose. While this practice requires the least amount of equipment, irregular borders frequently result. Sometimes fixed frames are used which include means for masking the edges of the paper. However in the use of such frames it is necessary that the dimensions of the paper be accurate since if the paper is too small, irregular and uneven borders result while if the paper is too large, it will not fit the frame. The use of such frames is therefore limited since photographic enlarging papers will vary somewhat in their dimensions, this being particularly the case as between different batches of paper cut from larger stock sheets. Some exposure frames have been provided with movable or adjustable sides in order to overcome the disadvantages of the fixed frames. However the adjustable frames heretofore available have ordinarily been awkward to load and unload, particularly under darkroom conditions, the movement or removal of one or more of the sides usually being necessary in order to insert or withdraw the paper.

A primary object of the invention is to provide an exposure frame which is easy to load and unload and in which a snug smooth fit of the paper can be obtained.

A further object of the invention is to provide a photographic exposure frame adapted to receive enlarging papers of varying dimensions and to mask the edges of such papers so as to provide uniform borders which are square with the paper.

A further object of the invention is to provide a photographic exposure frame at least one side of which is adjustable and is adapted for parallel movement with respect to the opposite side of the frame.

Still another object of the invention is to provide a photographic exposure frame having at least one adjustable side provided with light sealing means integral with the ends thereof.

Additional objects of the invention will become apparent from the following description thereof when taken in connection with accompanying drawing in which Fig. 1 is a plan view of one modification of the photographic exposure frame of the present invention; Fig. 2 is a cross sectional view of the frame taken along line 2—2 of Fig. 1; Fig. 3 is a partial enlarged cross sectional view taken along line 3—3 of Fig. 1; and Fig. 4 is a side elevational view of the frame shown in Fig. 1.

Briefly described the exposure frame of the present invention comprises a base plate and a rectangular frame structure including at least one adjustable side secured to the base plate. The adjustable side is so mounted on the base plate that it can be moved in parallel relationship to the opposite side in order that the frame will accommodate photographic papers of varying dimensions. Three sides of the frame structure are undercut, these undercut portions, in cooperation with the base plate, forming grooves or slots for receiving and masking the edges of the photographic paper. To facilitate the loading and unloading of the paper, the fourth side of the frame is preferably so mounted on the adjacent sides of the frame structure as to form with the base plate an aperture through which the paper can be inserted into the slots formed by the undercut portions of the frame structure.

In the embodiment of the invention shown in the accompanying drawing, numeral 10 indicates a base plate or platform provided with a plurality of pads 11 on which the platform is adapted to rest. Secured to the platform is a rectangular frame structure comprising longitudinal members 12 and 13 and transversely extending members 14 and 15. In the illustrated modification, members 13 and 14 are fixedly secured to the base plate while member 12 is adjustably secured thereto so that the width of the frame aperture can be varied to accommodate papers of different dimensions. Means providing for parallel movement of the member 12 with respect to the fixed side 13 in the modification illustrated comprises a pair of transverse slots 21 in the adjustable frame member which cooperatively engage a pair of rectangular guide posts 22 secured to the base plate 10. A pair of set screws 23 extending through the guide posts and provided with washers 24 and wing nuts 25 serve to secure the adjustable side member relatively to the base plate.

The inner edges of members 12, 13 and 14 are undercut adjacent the surface of the base plate 10, the shoulders defining the undercut portions cooperating with the base plate to form a slot 27 for receiving the edges of the photographic paper indicated by dotted lines at 28 and for masking the margins thereof so as to provide the desired border along the edges of the paper.

The remaining frame member 15 comprises a strip of suitable sheet material including a horizontal portion 30, adapted to rest on members 12 and 13, and a downwardly sloping portion 31 adapted to be received in a pair of cooperating opposed slots 32 provided in these members. Member 15 may be secured to fixed member 13 by any means such as a screw 33. So that the frame will be capable of accommodating standard sheets of different linear dimensions, a plurality of pairs of slots 32 may be provided in the members 12 and 13.

The member 15 is spaced from the base so that the paper can be inserted into the frame through the opening 34 between the lower edge of the sloping portion 31 and the surface of the base plate 10. To facilitate the insertion of the paper into the frame under darkroom conditions, the inner lower corners of members 12 and 13 may be bevelled as shown at 35 in Fig. 3 with the bevelled portions terminating in slots 21. In addition the central part of the end of the base adjacent member 15 as shown in Fig. 1 is cut away or notched as at 38 so that paper can be removed easily from the frame merely by grasping the edge of the paper extending beneath the sloping portion 31 of member 15 and over the notched portion of the base.

Light sealing means are provided between the end of the adjustable member 12 and the adjoining portion of member 14 in the form of a projection or tenon 36 on the end of the adjustable member, which projection is adapted to ride in a cooperating longitudinal groove 37 provided on the inner side of member 14.

From the above description, it will be seen that the present invention provides a simple, low cost exposure frame which is easy to load and unload. After the frame has once been adjusted to receive a given size of paper, the actual loading and unloading operations are quickly accomplished under working conditions. The forward edge of the paper to be inserted into the frame is guided into slots 27 and beneath member 15 by the bevelled edge portions 35. After exposure the border of the paper beneath the sloping portion 31 is readily accessible for removal of the paper.

Having described the invention in what are considered to be certain preferred embodiments thereof, it is desired that it be understood that the specific details shown and described herein are merely illustrative and that this invention may be carried out by other means.

What I claim is:

1. A photographic exposure frame comprising a base plate, a rectangular frame of a plurality of side members mounted on said base plate and including at least one adjustable side member, a plurality of the side members of said frame including said adjustable member being undercut to form with said base plate slots for receiving the edges of the photographic paper, and means arranged between said base plate and said adjustable side member for guiding the movement of the adjustable side member of said frame and maintaining said adjustable side member in parallel relationship with the opposite side of said frame.

2. A photographic exposure frame for exposing photographic enlarging papers, said exposure frame comprising a horizontal base plate, a horizontal rectangular frame structure mounted on said base plate, said frame structure comprising spaced apart side members and spaced apart end members, the inner faces of said side members and one of said end members being undercut to form with said base plate grooves for receiving the edges of said paper, at least one of said side members being adjustable, and means for maintaining said adjustable side member parallel with the opposite side member of said frame structure.

3. A photographic exposure frame for exposing photographic enlarging papers comprising a base plate for receiving the paper, a rectangular frame structure mounted on said base plate and adapted to hold the outer edges of said paper against said base plate, said frame structure comprising parallel side members at least one of which is adjustable, and means for maintaining the adjustable side member parallel to the opposite side member of said frame structure, said means comprising a pair of guide posts secured to said base plate and a pair of transverse slots in said adjustable member adapted operatively to engage said guide posts.

4. A photographic exposure frame for exposing photographic enlarging papers, said frame comprising a base plate, a frame structure mounted on said base plate and including parallel longitudinal members and parallel transverse members forming a rectangular opening, the inner edges of the longitudinal members and one transverse member being undercut adjacent the surface of said base plate to receive the corresponding edges of said paper, at least one of said undercut members being adjustably secured to the base plate for parallel movement with respect to the opposite member of said frame structure, a pair of opposed inclined slots in said longitudinal members adapted to receive the ends of the second transverse member, said second member comprising a strip of sheet material adapted to be received in said slots.

5. A photographic exposure frame comprising a horizontal base plate, a rectangular frame structure secured to said base, the inner faces of three sides of said frame structure being undercut to form with said base plate slots for receiving the edges of the photographic paper, the remaining side of said frame being mounted on the adjacent sides thereof and being spaced from said base plate to define a slit through which said paper can be inserted into said exposure frame, at least one of said adjacent sides being adjustable, and means for guiding the movement of said adjustable side and maintaining said side in parallel relationship with the opposite side of said frame structure, said guide means comprising a pair of guide posts secured to said base plate and a pair of transverse slots in said adjustable member for operative engagement with said guide posts.

MAURICE L. REANEY.

REFERENCES CITED

The following references are of record in the file of this patent:

UNITED STATES PATENTS

| Number | Name | Date |
| --- | --- | --- |
| 2,187,381 | Lane | Jan. 16, 1940 |
| 2,235,463 | Porcelli et al. | Mar. 18, 1941 |
| 2,239,783 | Heitschmidt | Apr. 29, 1941 |